US010986635B2

(12) United States Patent
Kato et al.

(10) Patent No.: US 10,986,635 B2
(45) Date of Patent: Apr. 20, 2021

(54) WIRELESS TERMINAL AND WIRELESS BASE STATION ALLOCATION METHOD

(71) Applicant: PANASONIC CORPORATION, Osaka (JP)

(72) Inventors: Osamu Kato, Fukuoka (JP); Noriyuki Shimizu, Kanagawa (JP); Masaaki Yoshino, Kanagawa (JP); Yasuhiro Aoyama, Tokyo (JP)

(73) Assignee: Panasonic Corporation, Osaka (JP)

( * ) Notice: Subject to any disclaimer, the term of this patent is extended or adjusted under 35 U.S.C. 154(b) by 90 days.

(21) Appl. No.: 16/465,830
(22) PCT Filed: Sep. 29, 2017
(86) PCT No.: PCT/JP2017/035600
§ 371 (c)(1),
(2) Date: May 31, 2019
(87) PCT Pub. No.: WO2018/105208
PCT Pub. Date: Jun. 14, 2018

(65) Prior Publication Data
US 2019/0297628 A1 Sep. 26, 2019

(30) Foreign Application Priority Data
Dec. 6, 2016 (JP) .............................. JP2016-236917

(51) Int. Cl.
*H04W 72/04* (2009.01)
*H04W 4/029* (2018.01)
(Continued)

(52) U.S. Cl.
CPC ....... *H04W 72/0453* (2013.01); *H04W 4/029* (2018.02); *H04W 16/32* (2013.01);
(Continued)

(58) Field of Classification Search
CPC ..... H04W 72/04; H04W 4/029; H04W 48/16; H04W 16/32; H04W 72/0453; H04W 64/00; H04W 64/003; H04W 88/06
See application file for complete search history.

(56) References Cited

U.S. PATENT DOCUMENTS

2013/0195078 A1* 8/2013 Kobayashi .......... H04W 36/165
370/331
2014/0071966 A1* 3/2014 Shikatani .............. H04W 76/15
370/336
(Continued)

FOREIGN PATENT DOCUMENTS

JP 2013-021516 A 1/2013
JP 2016-134731 A 7/2016
(Continued)

OTHER PUBLICATIONS

International Search Report, dated Nov. 21, 2017, for corresponding Japanese Application No. PCT/JP2017/035600, 5 pages (With English Translation).
(Continued)

*Primary Examiner* — Kyaw Z Soe
(74) *Attorney, Agent, or Firm* — Seed IP Law Group LLP

(57) ABSTRACT

A wireless terminal capable of communicating with multiple wireless base stations through a network in which multiple wireless communication methods are used in a mixed manner. A storage unit stores, as a communication history, at least location information for the wireless terminal and information pertaining to the wireless base station at the time of communication with each wireless base station. An acquisition unit acquires the location information for the wireless terminal. On the basis of the acquired location information for the wireless terminal and the communication history stored in the storage unit a derivation unit derives a connection base station from the multiple wireless base stations, as the wireless base station to be used in data communication. A communication unit performs data communication with the derived connection base station.

14 Claims, 6 Drawing Sheets

(51) Int. Cl.
*H04W 48/16* (2009.01)
*H04W 16/32* (2009.01)
*H04W 88/06* (2009.01)
*H04W 64/00* (2009.01)

(52) U.S. Cl.
CPC ........... *H04W 48/16* (2013.01); *H04W 64/00* (2013.01); *H04W 88/06* (2013.01)

(56) References Cited

U.S. PATENT DOCUMENTS

| | | | | |
|---|---|---|---|---|
| 2014/0204925 A1* | 7/2014 | Otomo | ................. | H04W 68/04 370/338 |
| 2014/0213251 A1* | 7/2014 | Hasegawa | ............. | H04W 48/04 455/435.1 |
| 2015/0036521 A1* | 2/2015 | Minamino | ............ | H04W 48/16 370/252 |
| 2018/0041945 A1 | 2/2018 | Kato | | |

FOREIGN PATENT DOCUMENTS

| | | | |
|---|---|---|---|
| WO | 2013/121670 A1 | 8/2013 | |
| WO | 2016/170719 A1 | 10/2016 | |

OTHER PUBLICATIONS

Japanese Written Opinion, dated Nov. 8, 2017, for corresponding Japanese Application No. PCT/JP2017/035600, 5 pages.

\* cited by examiner

FIG. 3

| i | 1 | 2 | 3 | 4 | 5 | 6 | 7 | 8 | ... | 97 | 98 | 99 | 100 |
|---|---|---|---|---|---|---|---|---|---|---|---|---|---|
| (X,Y,Z) | (X1, Y1, Z1) | (X2, Y2, Z2) | (X3, Y3, Z3) | (X4, Y4, Z4) | (X5, Y5, Z5) | (X6, Y6, Z6) | (X7, Y7, Z7) | (X8, Y8, Z8) | ... | (X97, Y97, Z97) | (X98, Y98, Z98) | (X99, Y99, Z99) | (X100, Y100, Z100) |
| m-n | 3-1 | 3-2 | 6-2 | 8-2 | 1-4 | 2-3 | 2-1 | 4-2 | ... | 3-2 | 3-4 | 6-2 | 6-1 |

| i | 2 | 7 | 43 | 18 | 20 | 97 | 55 | 8 | 44 | 99 |
|---|---|---|----|----|----|----|----|---|----|----|
| Di | 0.07 | 0.08 | 0.12 | 0.12 | 0.16 | 0.20 | 0.29 | 0.30 | 0.47 | 0.89 |
| m-n | 3-2 | 2-1 | 9-2 | 7-3 | 2-1 | 3-2 | 2-1 | 4-2 | 3-2 | 3-2 |

T2

WIRELESS TERMINAL AND WIRELESS BASE STATION ALLOCATION METHOD

TECHNICAL FIELD

The present disclosure relates to a wireless terminal and a base station allocation method that determine and allocate a wireless base station that is a communication partner at the time of wireless communication.

BACKGROUND ART

In the related art, technologies are present that estimate communication means (for example, a route for a bus or a railroad) that, for transportation, is used by a user who carries a portable mobile terminal, based on a communication history of a portable mobile terminal that possibly performs communication, which is represented by a smartphone or a tablet terminal type computer. For example, in PTL 1, a route estimation apparatus estimates a route that, for transportation, is used by a user who carries a mobile terminal, based on a representative value (for example, an average value) of a distance between a location where a mobile terminal performs communication and, for example, a location of a railroad route.

CITATION LIST

Patent Literature

PTL 1: JP-A-2016-134731

SUMMARY OF INVENTION

Technical Problem

The present disclosure, which is made in view of the above-described situation in the related art, provides a wireless terminal and a wireless base station allocation method that determine and allocate a wireless base station that is a communication partner when a request is made for a connection for wireless communication, based on a communication history at a current location of the wireless terminal itself, and suppresses a degradation of a probability of connection to an optimal cell.

Solution to Problem

According to an aspect of the present disclosure, there is provided a wireless terminal that is capable of performing communication with multiple wireless base stations through a network in which multiple wireless communication schemes are used in a mixed manner, the wireless terminal including: an accumulation unit in which at least location information on the wireless terminal and information pertaining to the wireless base station are accumulated, as a communication history, at the time of communication in the past with each of the wireless base stations; an acquisition unit that acquires the location information on the wireless terminal; a derivation unit that derives a connection base station, as a wireless base station that is to be used for data communication, from among the multiple wireless base stations, based on the acquired location information on the wireless terminal and the communication history that is accumulated in the accumulation unit; and a communication unit that performs the data communication with the derived connection base station.

Furthermore, according to another aspect of the present disclosure, there is provided a wireless base station allocation method in a wireless terminal that is capable of performing communication with multiple wireless base stations through a network in which multiple wireless communication schemes are used in a mixed manner, the wireless base station allocation method including: a step of accumulating at least location information on the wireless terminal and information pertaining to the wireless base station, as a communication history, in an accumulation unit at the time of communication in the past with each of the wireless base stations; a step of acquiring the location information on the wireless terminal; a step of deriving a connection base station, as a wireless base station that is to be used for data communication, from among the multiple wireless base stations, based on the acquired location information on the wireless terminal and the communication history that is accumulated in the accumulation unit; and a step of performing the data communication with the derived connection base station.

Advantageous Effects of Invention

According to the present disclosure, a wireless base station that is a communication partner when a request is made for a connection for wireless communication is determined and allocated based on a communication history at a current location of a wireless terminal itself. Because of this, a degradation of a probability of connection to an optimal cell can be suppressed.

BRIEF DESCRIPTION OF DRAWINGS

FIG. 3 is a schematic diagram illustrating an example of a total communication history table T1 that retains a communication history for every location of the wireless terminal.

FIG. 4 is a schematic diagram illustrating an example of a high-level communication history table T2 showing a correspondence relationship between n high-level distances Di and a radio resource (a wireless base station a wireless frequency).

DESCRIPTION OF EMBODIMENTS

Figure 1:
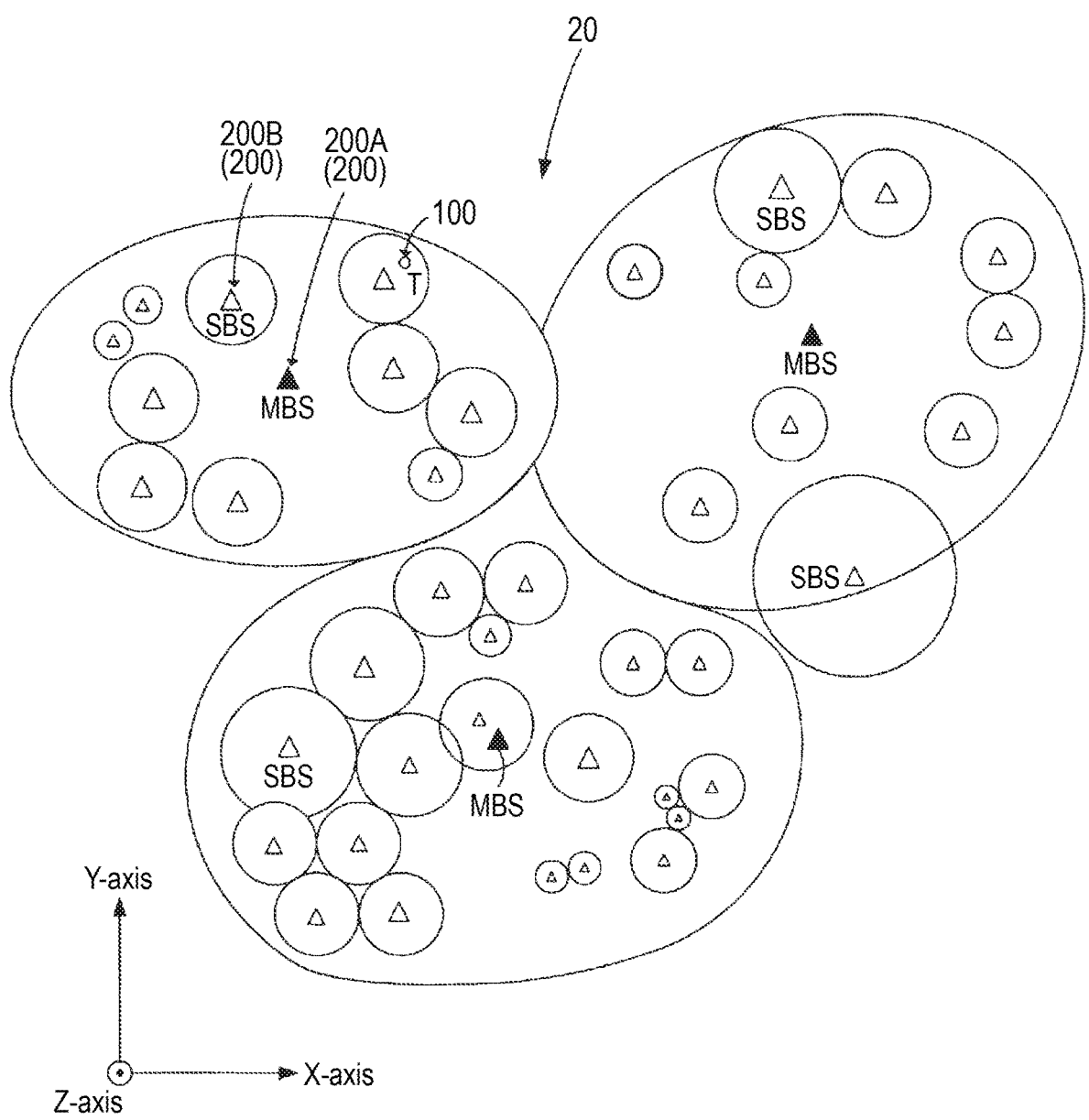
FIG. 1 is a schematic diagram illustrating an example of a heterogeneous network that is configured by a wireless communication system according to the present embodiment.

In recent years, for a wireless communication system in which a wireless terminal and a wireless base station apparatus are connected to a network, a heterogeneous network in that a small cell having a comparatively small cell radius and a macro cell having a comparatively large cell radius overlap in area has been under study. In the heterogeneous network, it is assumed that throughput (bps) of small cell is extraordinary higher than throughput (bps) in the macro cell.

For example, it is assumed that the micro cell is for Long Term Evolution (LTE) and that cell throughput is 300 Mbps. If the number of wireless terminals that make a connection to the macro cell is 100, throughput per one terminal is 3 Mbps. On the other hand, it is assumed that the small cell is for the 5th generation mobile communication system (5G) and that cell throughput is 10 Gbps. Even if the number of wireless terminals that make a connection to the small cell is 100, the throughput per one terminal is 100 Mbps. If the number of wireless terminals that makes a connection to the small cell is 10, the throughput per one terminal is 1 Gbps. If the number of wireless terminals that make a connection to the small cell is 2, the throughput per one terminal is 5 Gbps. The throughput per one terminal is extraordinary higher than that of the macro cell. Therefore, in the heterogeneous network, it is desirable that a wireless terminal which is on the move makes a connection to the small cell.

At this point, when performing wireless communication, the wireless terminal determines and allocates a wireless base station that is a communication partner with which the wireless terminal itself communicates wirelessly, and a wireless frequency (in other words, a carrier frequency or a wireless channel) that, when necessary, is used for the wireless terminal itself to perform wireless communication. However, in Patent Literature 1, it is not considered that the wireless base station or the wireless frequency that is necessary when the wireless terminal performs wireless communication is determined using a communication history of a portable mobile terminal. Because of this, this determination is difficult to make.

Furthermore, in the heterogeneous network described above, with a ratio of a small cell area to all area being low, the longer the time required for cell selection, the higher the probability becomes that the wireless terminal on the move will lose an opportunity to make a connection to an optimal cell (in other words, a small cell where high-speed throughput is obtained) in each location. Accordingly, a method is proposed in which an entire coverage area of the heterogeneous network is partitioned into area blocks of certain size, in which a location of the wireless terminal is associated with an area block number, and in which an attempt is made to make a connection to an optimal cell using a communication history for every area block number. Based on current location information on the wireless terminal itself, and on a communication history that is retained for every area block number, the wireless terminal searches for a wireless base station to which the wireless terminal made a connection in the past in such a location and area block to perform wireless communication.

However, in this method, if the area block is large (for example, 1 km×1 km), many communication histories for every area block can be accumulated, there is a high probability that a base station (in other words, a cell) most suitable for a connection at a current pinpoint location of the wireless terminal will be found erroneously. On the other hand, if the area block is small (for example, 5 m×5 m), the number of area blocks is huge, and communication histories are excessively subdivided for accumulation. Because of this, the number of communication histories is too small for every area block, and, likewise, it is difficult to select the base station (in other words, the cell) most suitable for the connection at the current pinpoint location of the wireless terminal. Therefore, there is also a high demand for the location accuracy (positioning accuracy) of the wireless terminal and the time required for location identification thereof. Moreover, in the method described above, regardless of a magnitude of the area block, an amount of prior work for dividing the entire coverage area of the heterogeneous network into area blocks is also huge.

The present disclosure, which is made in view of the above-described situation in the related art, provides a wireless terminal and a wireless base station allocation method that determine and allocate a wireless base station that is a communication partner when a request is made for a connection for wireless communication, based on a communication history at a current location of the wireless terminal itself, and suppresses a degradation of a probability of connection to an optimal cell.

A wireless terminal and a wireless base station allocation method according to the present embodiment that is specifically disclosed in the present disclosure will be described in detail below, with appropriate reference to the drawing. However, in some cases, a description more detailed than is necessary is omitted. For example, in some cases, a detailed description of an already-known matter is omitted, or a description of substantially the same configuration is not repeated. The reason for this is to avoid unnecessary redundancy of the following description and to help a person of ordinary skill in the art to achieve easy understanding. It is noted that the accompanying drawings and the following description are provided in order for a person of ordinary skill in the art to get a sufficient understanding of the present disclosure, and therefore, this is not intended to impose a limitation on a subject matter that is recited in a claim.

FIG. 1 is a schematic diagram illustrating an example of a heterogeneous network 20 that is configured by a wireless communication system 10 according to the present embodiment. A wireless communication system 10 is configured to include at least one wireless terminal 100 and multiple wireless base stations 200. The wireless terminal 100 and each of the wireless base station 200 are connected through a wireless communication line. It is noted that in FIG. 1, for brief description, only one wireless terminal 100 is illustrated, and that the horizontal direction with respect to the paper sheet where FIG. 1 is drawn is defined as the X-axis, the vertical direction with respect to the paper sheet is defined as the Y-axis, and the direction perpendicular to the X-axis and the Y-axis is defined as the Z-axis.

The wireless communication system 10 configures the heterogeneous network 20 over which each of the wireless base stations 200 that are communication partners to which the wireless terminal 100 makes a connection when performing wireless communication possibly performs wireless communication in compliance with different wireless standard schemes. The wireless terminal 100 communicates with the wireless base station 200. More precisely, the heterogeneous network 20, multiple wireless base stations 200, which support multiple different wireless communication schemes (for example, Radio Access Technologies (RATs) or cell radii), are present in a mixed manner. In the heterogeneous network 20, for example, multiple types of wireless standards are present in a mixed manner, and wireless base stations 200 with different cell radii overlap in area. The RAT, for example, includes wireless communication standards, and pieces of information on wireless frequencies.

The heterogeneous network 20 may not be a C/U separation type network and may be the C/U separation type network. In the present embodiment, a network that is not a C/U separation type is exemplarily described. More precisely, in the wireless communication system 10, communication relating to control data and communication relating to user data are performed by the same wireless base station 200.

Wireless base stations 200 include a macro cell wireless base station 200A and a small cell wireless base station 200B. The wireless terminal 100 communicates the control data and communicates the user data with any one of the macro cell wireless base station 200A and the small cell wireless base station 200B. The control data includes data relating to Control (C)-Plane. The user data includes data relating to User (U)-Plane. Examples of the user data can include image data (for example, a moving image or a still image), and audio data, and can include a large amount of data.

The C-Plane is a communication protocol for communicating the control data for a call connection or radio resource allocation in wireless communication. The U-Plane is a communication protocol for actually performing communication (for example, video communication, voice communication, or data communication) between the wireless terminal 100 and the wireless base station 200 using a radio resource that is allocated.

A cell radius of the macro cell wireless base station 200A, for example, is 1 km to several km and is comparatively is great. The RAT that is employable by the macro cell wireless base station 200A, for example, is one type (for example, LTE). The cell radius is equivalent to a maximum transfer distance of the wireless base station 200.

A cell radius of the small cell wireless base station 200B, for example, is 10 m to 100 m and is comparatively is small. RATs that are employable by the small cell wireless base station 200B are various and multiple types of them are present. It is noted that it is also considered that, for example, the cell radius may be equal to or greater than 100 m in a mountainous region, a desert region, and a wooded region, and is greater than the cell radius of the macro cell wireless base station 200A. More precisely, at this point, a distinction between the macro cell wireless base station 200A and the small cell wireless base station 200B does not depend on a magnitude of the cell radius.

In FIG. 1, "MBS" (▲) denotes the macro cell wireless base station 200A, "SBS" (△) denotes the small cell wireless base station 200B, and "T" denotes the wireless terminal 100. A line that surrounds the macro cell wireless base station 200A denotes a range where the macro cell wireless base station 200A possibly performs the communication. A line that surrounds the small cell wireless base station 200B denotes a range where the small cell wireless base station 200B possibly performs the communication. The range where the wireless base station 200 possibly performs the communication, for example, is determined according to a location of the wireless base station 200 and the cell radius.

The wireless terminal 100 and the wireless base station 200 sets a RAT that is to be used for wireless communication, which is selected from among RATs (for example, wireless communication standards or wireless frequencies) that are employable by each of them, and performs wireless communication using the RAT that is set. It is possible that each of the wireless terminal 100 and the wireless base station 200 employs one or more RATs.

Example of the wireless communication standard include standards for Long Term Evolution (LTE), a Wireless Local Area Network (LAN), Digital Enhanced Cordless Telecommunication (DECT), the 3rd generation mobile communication system (3G), the 4th generation mobile communication system (4G), the 5th generation mobile communication system (5G).

Pieces of specific information on the RAT, for example, include RAT 1 to RAT 5 that follow. RAT 1, for example, is for LTE in a wireless frequency band of 700 MHz to 3 GHz. RAT 2, for example, is for LTE-Advanced in a wireless frequency band of 15 GHz. RAT 3, for example, is for wireless LAN communication in a wireless frequency band of 5 GHz. RAT 4, for example, is for a wireless communication scheme in a wireless frequency band of 15 GHz band and is for a 5th generation mobile communication scheme. RAT 5, for example, is for a wireless communication scheme (for example, a millimeter wave communication) (for example, WiGig) in a wireless frequency band of 60 GHz band.

Figure 2:
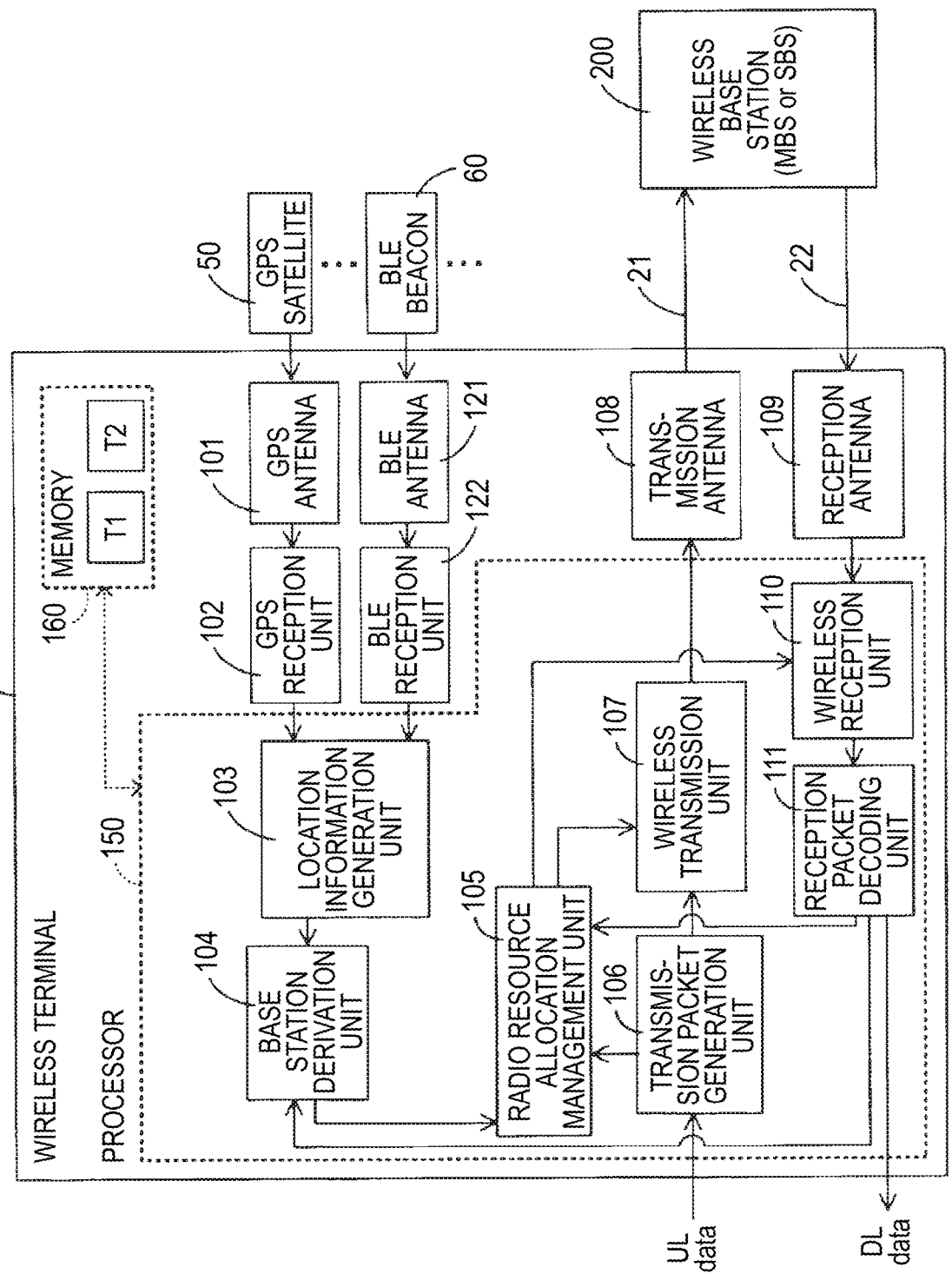
FIG. 2 is a block diagram illustrating in detail an example of an internal configuration of a wireless terminal according to the present embodiment.

FIG. 2 is a block diagram illustrating in detail an example of an internal configuration of the wireless terminal 100 according to the present embodiment. The wireless terminal 100 is configured to include a processor 150, a memory 160, a Global Positioning System (GPS) antenna 101, a GPS reception unit 102, a transmission antenna 108, a reception antenna 109, a Bluetooth (a registered trademark) Low Energy (BLE) antenna 121, and a BLE reception unit 122.

In cooperation with the memory 160, the processor 150 performs various processing operations or control operations. Specifically, referring to a program and data that are retained in the memory 160, the processor 150 realizes a function of each of the following units by executing the program. The units include a location information generation unit 103, a base station derivation unit 104, a radio resource allocation management unit 105, a transmission packet generation unit 106, a wireless transmission unit 107, a wireless reception unit 110, and a reception packet decoding unit 111.

The memory 160, for example, has a Random Access Memory (RAM) as a work memory that is used when the wireless terminal 100 performs processing, and a Read Only Memory (ROM) in which a program and data that define operation of the wireless terminal 100 are stored. Various pieces of data or information are temporarily stored in the RAM. A program that defines the operation (for example, processing (a step) that has to be performed as the wireless base station allocation method according to the present embodiment) of the wireless terminal 100 is written to the ROM.

Furthermore, a total communication history table T1 or a high-level communication history table T2, which will be described below, is retained in the memory 160 as an example of an accumulation unit. It is noted that in FIG. 1, the memory 160 is illustrated as being configured separately from the processor 150, but may be built into the processor 150. The memory 160 may include a primary storage device and a secondary storage device.

The GPS antenna 101 receives multiple signals, each of which indicates a time and a location (coordinates) of each of the GPS satellites 50, which are transmitted from each of the multiple (for example, three or four) GPS satellites 50, and outputs the received multiple signals to the GPS reception unit 102. Each of the GPS satellites 50 transmits a signal indicating the time and the location (the coordinates) of the GPS satellite 50.

The GPS reception unit 102 as an example of an acquisition unit calculates and acquires location information on the GPS reception unit 102 (more precisely, location information on the wireless terminal 100 itself (location information on the GPS reception unit 102 itself)) based on the multiple signals that are received by the GPS antenna 101. The location information that is obtained by this calculation, for example, indicates a current location of the wireless terminal 100 that is positioned outdoors. It is noted that the GPS reception unit 102 may be provided within the processor 150. The GPS reception unit 102 outputs the location information on the wireless terminal 100, which is obtained by the calculation, to the processor 150. It is noted that the calculation of the location information by the GPS reception unit 102 may be performed by the location information generation unit 103 of the processor 150 instead of the GPS reception unit 102. In this case, the information indicates the time and the location of each GPS satellite 50 that are included in the multiple signals that are received by the GPS antenna 101 is input into the location information generation unit 103 through the GPS reception unit 102.

At this point, in a case where the wireless terminal 100 is positioned outdoors, the reliability of the location information on the wireless terminal 100 that is calculated based on the signals from the multiple GPS satellites 50 described above is considerably high. However, in a case where the wireless terminal 100 is positioned indoors (for example, within a building or in an underground shopping center, but without any limitation to these areas) (the same is hereinafter true) or in the vicinity of a border between the outside and the inside of a building, in some cases, the location information on the wireless terminal 100 that is calculated based on the signals from the multiple GPS satellites 50 described above has a fixed error. In this manner, in a case where the wireless terminal 100 is positioned indoors or in the vicinity of a border between the outside and the inside of a building, the wireless terminal 100 calculates and acquires current location information on the wireless terminal 100 itself (current location information on the GPS reception unit 102 itself) based on the multiple signals each of which indicates a time and a location (coordinates) of each of the BLE beacons 60, which are transmitted from each of the multiple BLE beacons 60 that are installed indoors. For example, in a case where it is determined that a Received Signal Strength Indicator (RSSI) of the signal from the BLE beacons 60 is greater than a prescribed threshold, the wireless terminal 100 determines that the wireless terminal 100 itself is positioned indoors or in the vicinity of a border between the outside and the inside of a building, and calculates the location information on the wireless terminal 100 itself based on the signals that are transmitted from the multiple BLE beacons 60. It is noted that a method of determining that the wireless terminal 100 is positioned indoors or in the vicinity of a border between the outside and the inside of a building is not limited to the method that is based on a result of comparison between the Received Signal Strength Indicator and the prescribed threshold, which are described above.

The BLE antenna 121 receives the multiple signals each of which indicates the time and the location (coordinates) of each BLE beacon 60 that are transmitted from each of the multiple (for example, two) BLE beacons 60, and outputs the received multiple signals to the BLE reception unit 122. Each of the BLE beacons 60 transmits the signal indicating the time and the location (the coordinates) of each BLE beacon 60. Furthermore, a distance between each of the BLE beacons 60 is already known. Each of the wireless terminal 100 may acquire, in advance, information on the distance between each of the BLE beacons 60, and may acquire such information from an external apparatus (not illustrated) (for example, any other wireless terminal or a distance information management server) directly or through a network (not illustrated).

The BLE reception unit 122 as an example of the acquisition unit calculates and acquires location information on the BLE reception unit 122 (more precisely, the location information on the wireless terminal 100 itself (the location information on the BLE reception unit 122 itself)), for example, using a triangulation method, based on the multiple signals that are received by the BLE antenna 121. The location information that is obtained by this calculation indicates a current location of the wireless terminal 100 that is positioned indoors or in the vicinity of a border between the outside and the inside of a building.

It is noted the BLE reception unit 122 may calculate the location information on the wireless terminal 100 positioned indoors or in the vicinity of a border between the outside and the inside of a building using a combination of the multiple signals that are received by the BLE antenna 121, and a well-known method (for example, Pedestrian Dead Reckoning (PDR) or Pedestrian Map Matching (PMM)).

At this point, because installation information on each of the BLE beacons 60 is said to have information that consists of a latitude, a longitude, and an altitude, in the same manner as in a case where the wireless terminal 100 is positioned outdoors, although the wireless terminal 100 is positioned indoors or in the vicinity of a border between the outside and the inside of a building, a method of acquiring the location information in an outdoor environment can be applied extensively to an indoor environment. Because of this, the location information that is the same as the latitude, the longitude, and the altitude can be acquired. It is noted that the BLE reception unit 122 may be provided within the processor 150. The BLE reception unit 122 outputs the location information on the wireless terminal 100 that is obtained by the calculation, to the processor 150. It is noted that the calculation of the location information by the BLE reception unit 122 may be performed by the location information generation unit 103 of the processor 150 instead of the BLE reception unit 122. In this case, information indicating the time and the location of each BLE beacon 60 that are included in the multiple signals, which are received by the BLE antenna 121, is input into the location information generation unit 103 through the BLE reception unit 122.

FIG. 3 is a schematic diagram illustrating an example of the total communication history table T1 that retains a communication history for every location of the wireless terminal 100. The total communication history table T1 retains pieces of information that are communication histories (communication records) that were accumulated whenever the wireless terminal 100 performed, in the past, wireless communication with any wireless base station (hereinafter referred to "connection base station") of the multiple wireless base stations 200. The connection base station is the wireless base station 200 that is connected to the wireless terminal 100 for communication. The total communication history table T1 is retained in the memory 160 of each of the wireless terminals 100.

The communication history that is retained in the total communication history table T1, for example, has information indicating a sequential order (an order i) at the time of the wireless terminal 100's wireless communication with the connection base station, information indicating a location (latitude X, longitude Y, altitude Z) of the wireless terminal 100 at the time of the wireless communication, and information indicating an identification number m of the connection base station, and information indicating a wireless frequency n (a carrier frequency), in a manner that are associated with each other. For example, when a communication connection is made to the first connection base station, this means that the wireless terminal 100 is present at a location (X1, Y1, Z1) and that wireless communication with the connection base station with a number 3 is performed using the wireless frequency (the carrier frequency) with a number 1. A number indicating each of the connection base station (the wireless base station) and the wireless frequency (the carrier frequency) is known to each wireless terminal 100 that uses the heterogeneous network 20 which is illustrated in FIG. 1, and for example, is retained in advance in the memory 160. In FIG. 3, as a result of the accumulation in the past, communication histories that correspond to the number of times that communication was performed, which is for example, 100, are illustrated. It is noted that as a result of the accumulation in the past, communication histories that correspond to the number of times that communication was performed, which is, for example, 300, may be used.

It is noted that, although not illustrated in FIG. 3, the communication history may include the RAT (for example, LTE) that is employed by the connection base station, the number of times of communication with the connection base station (the number of times of wireless connection), and information on an amount of communication (an amount of communication data) relating to the communication with the connection base station.

In the present embodiment, histories of communication between the wireless terminal 100 and the connection base station are managed as the total communication history table T1 in the memory 160. Furthermore, when a communication connection to the connection base station that is derived by the base station derivation unit 104 succeeds, the communication history is updated by the radio resource allocation management unit 105 as an example of an update unit (for example, refer to Step S12 in FIG. 6, which will be described below).

For example, in the case where the wireless terminal 100 is positioned outdoors, the location information generation unit 103 generates the location information on the wireless terminal 100 (more precisely, current location information on the wireless terminal 100) based on the information from the GPS reception unit 102, and outputs the generated location information to the base station derivation unit 104. For example, in a case where the wireless terminal 100 is positioned indoors or in the vicinity of a border of the outside and the inside of a building, the location information generation unit 103 generates the location information on the wireless terminal 100 (more precisely, current location information on the wireless terminal 100) based on the information from the BLE reception unit 122, and outputs the generated location information to the base station derivation unit 104.

The base station derivation unit 104 as a derivation unit derives candidate connection base station and wireless frequency that are used for data communication (for example, control data or user data), among from multiple wireless base stations 200 within the heterogeneous network 20, based on the location information on the wireless terminal 100 (more precisely, current location information on the wireless terminal 100) that is generated by the location information generation unit 103, and on the total communication history table T1 in the memory 160. The base station derivation unit 104 outputs a result of the derivation of the radio resource (for example, (1) an identification number of the wireless base station, (2) an identification number of the wireless base station and an identification number of the wireless frequency (the carrier frequency)) to the radio resource allocation management unit 105.

Specifically, the base station derivation unit 104 derives a connection base station and a wireless frequency, with a preference for a wireless base station (a connection base station) and a wireless frequency that are allocated many times for wireless communication, from a prescribed number (k is a default value) of communication histories in which a distance Di that is based on current location information of the wireless terminal 100 and the location information on the wireless terminal 100 in the communication history is short.

FIG. 4 is a schematic diagram illustrating an example of the high-level communication history table T2 showing a correspondence relationship between a high-level n distances Di and a radio resource (the wireless base station and the wireless frequency). The high-level communication history table T2 is generated by the base station derivation unit 104. The high-level communication history table T2 results from extracting a prescribed number k of high-level communication histories in which the distance Di between the location information on the wireless terminal 100 and the location information on the wireless terminal 100 when wireless communication with the connection base station wash performed in the past is short, from among communication histories in the total communication history table T1. The high-level communication history table T2 is retained in the memory 160 in each of the wireless terminals 100.

The communication history that is retained the high-level communication history table T2, for example, has information indicating a sequential order (an order i) when the wireless terminal 100 performed wireless communication with the connection base station, information indicating a distance Di between the location (latitude X, longitude Y, altitude Z) of the wireless terminal 100 when the wireless communication was performed and a current location (latitude X, longitude Y, altitude Z) of the wireless terminal 100, information indicating the identification number m of the connection base station, and information indicating the wireless frequency n (the carrier frequency), in a manner that is associated with each other. In FIG. 4, as a prescribed number k, "10" is illustrated as an example. More precisely, a distance Di "0.07" is a minimum value (more precisely, a position that is closest to a current location of the wireless terminal 100 and at which the communication record in the past is present). A distance Di "0.89" is a maximum value (more precisely, a location that is positioned farthest from a current location of the wireless terminal 100, among high-level 10 communication histories, and at which the communication record in the past is present). For example, when the distance Di is "0.07" that is the shortest, this means that the wireless terminal 100 performs wireless communication with the connection base station with a number 3, using the wireless frequency (the carrier frequency) with a number 2. In the same manner, when the distance Di is "0.89" that is the longest, this means that the wireless terminal 100 performs wireless communication with the connection base station with the number 3, using the wireless frequency (the carrier frequency) with the number 2.

It is noted that the total communication history table T1 and the high-level communication history table T2 may be provided individually for an uplink 21 and a downlink 22 and may be provided for common use. Furthermore, the RAT that is employable by the wireless base station 200, which is retained in the total communication history table T1 and the high-level communication history table T2, is the RAT that is also employable by the wireless terminal 100.

It is noted that the uplink 21 is a wireless line from the wireless terminal 100 toward the wireless base station 200. The downlink 22 is a wireless line from the wireless base station 200 to the wireless terminal 100. The wireless lines broadly include various public lines, mobile telephone lines, wide area wireless lines, and the like.

An example where the base station derivation unit 104 derives (calculates) the connection base station and the wireless frequency is in detail described here with reference to FIGS. 3 and 4. In FIG. 3, it is assumed that the communication histories which correspond to the number of times that communication was performed in the past, which is 100, are retained in the total communication history table T1, and that a request to the wireless terminal 100 for the 101-st communication connection is made at a location (Xk, Yk, Zk).

Referring to the total communication history table T1 in FIG. 3, the base station derivation unit 104 calculates the distance Di that is based on a current location (Xk, Yk, Zk) of the wireless terminal 100 and the location (Xi, Yi, Zi) of the wireless terminal 100 in the communication history, according to Equation (1). In Equation (1), i=1 to 100. It is noted that an example of calculating the distance Di is not limited to a humming distance in Equation (1), and that a Euclid distance in Equation (2) may be used.

[Equation 1]

$$Di = |Xk-Xi| + |Yk-Yi| + |Zk-Zi| \quad (1)$$

[Equation 2]

$$Di = \sqrt{(Xk-Xi)^2 + (Yk-Yi)^2 + (Zk-Zi)^2} \quad (2)$$

The base station derivation unit 104 extracts high-level 10 orders i (for example, in a case where n=10), information indicating the identification number m of the connection base station, and information indicating the wireless frequency n (the carrier frequency), from each of the distances Di that are calculated using Equation (1) or Equation (2), and thus generates the high-level communication history table T2 in FIG. 4. With the high-level communication history table T2 in FIG. 4, it is possibly determined that, as radio resources (for example, identification numbers of the connection base stations and the identification numbers of the wireless frequency), radio resource (3-2) is used (allocated) four times, radio resource (2-1) three times, radio resource (9-2) one time, radio resource (7-3) one time, and radio resource (4-2) one time.

Thus, in response to a request for the 101-st new communication connection, the base station derivation unit 104 determines (derives) that, as priorities of radio resources that have to be allocated, radio resource (3-2) is followed by radio resource (2-1), then by radio resource (9-2), then by radio resource (7-3), and then by radio resource (4-2). Priorities of the candidate radio resources that have to be allocated are determined in this manner, but, for a current wireless terminal 100, it is also assumed that radio resource (3-2) is not necessarily a candidate for a wireless base station 200 with a best radio resource. This is because, in some cases, radio resource (3-2) can be occupied by any other wireless terminal that is present within the heterogeneous network 20. Importantly, in some cases, a range of the priorities of the radio resources that have to be allocated is narrowed down by the base station derivation unit 104.

At this point, the following order: radio resource (9-2), radio resource (7-3), radio source (4-2) corresponds to order of increasing the distance Di. Accordingly, it is possible that the base station derivation unit 104 allocates the connection base station and the wireless frequency in order of decreasing the number of records of wireless communication with the wireless terminal 100 in the past, and the data communication can be easily performed in a suitable manner under a more stable communication environment in a current location of the wireless terminal 100.

At this point, the base station derivation unit 104 is described as extracting both information indicating the identification number m of the connection base station and the information indicating the wireless frequency n (the carrier frequency), as candidate radio resources, but for example, only the information indicating the identification number m of the connection base station may be extracted. The same is hereinafter true. More precisely, in the following description, it is assumed that only two patterns, (1) both the information indicating the identification number m of the connection base station and the information indicating the wireless frequency n (the carrier frequency) and (2) the information indicating the identification number m of the connection base station are included in the radio resource.

It is noted that as in Equation (1) or Equation (2), the base station derivation unit 104 calculates the distance Di that has a three-dimensional element, but calculate the distance Di that has a two-dimensional element without considering a Z coordinate in Equation (1) or Equation (2). Accordingly, in a case where only two-dimensional element is considered as the distance Di (for example, when a request is made for a new communication connection at a location that has the same altitude as when all wireless communications were performed in the past), a load on the computation by the base station derivation unit 104 when generating the high-level communication history table T2 is reduced.

It is noted that in the calculation of the distance Di described above, the base station derivation unit 104 generates the high-level communication history table T2 using all communication histories in the total communication history table T1, but may generate the high-level communication history table T2 using only a prescribed number (for example, 10 or 30) of communication histories in the total communication history table T1. Accordingly, the load on the computation by the base station derivation unit 104 when generating the high-level communication history table T2 is reduced.

Furthermore, the base station derivation unit 104 may generate the high-level communication history table T2 using a prescribed number of communication histories among communication histories in a time zone that is the same as a time zone at the time when a request is made to the wireless terminal 100 for a new communication connection. Accordingly, the base station derivation unit 104 can generate the high-level communication history table T2 that has a communication history in accordance with a communication environment that varies with one time zone to another, for example, like in a daytime time zone or a nighttime time zone.

Furthermore, the base station derivation unit 104 extracts the prescribed number k of communication histories only from among communication histories in which the distance Di is at or below a prescribed threshold Dth (a default value), and thus may generate the high-level communication history table T2. Accordingly, it is possible that a communication history in which the distance Di is greater than the prescribed threshold Dth (in other words, a communication history in a case where there is a long distance between a location of the wireless terminal at the time of the wireless communication by the wireless terminal 100 in the past and a current location thereof) is excluded and that the high-level communication history table T2 is generated. Because of this, the wireless terminal 100 can perform allocation of a more suitable radio resource according to an environment of a network that is provided in the vicinity of the current location.

It is noted that the base station derivation unit 104 is described as deriving the connection base station and the wireless frequency with a preference for the connection base station and the wireless frequency, to which the radio resource (the identification number of the connection base station and the identification number of the wireless frequency) is allocated many times, from the high-level communication history table T2, but that a derivation method is not limited to this. For example, in a case where the amount of communication data is included in the communication history in the high-level communication history table T2, the base station derivation unit 104 may derive the connection base station and the wireless frequency with a preference for the connection base station and the wireless frequency in order of decreasing the amount of communication data (in other words, the number of transmission and reception data bytes). Accordingly, it is possible that the wireless terminal 100, for example, preferentially allocates the connection base station and the wireless frequency that possibly provides a small cell (in other words, a cell that has a high likelihood that there will be a large amount of communication data) where the high-speed throughput is obtained, as is the case with the 5th generation mobile communication system (5G), over the heterogeneous network 20, and an amount of suitable communication data is easy to perform.

It is noted that the base station derivation unit 104 may multiply a specific factor (for example, the altitude) at a location (latitude, longitude, altitude) on the wireless terminal 100 by a weighting coefficient when calculating the distance Di (refer to Equation (3)). In Equation (3), 10 that is a coefficient of $|Zk-Zi|$ is only an example of the weighting coefficient. Although the latitudes or the longitudes in the location information on the wireless terminal 100 are the same, when the altitudes are different, in some cases, a communication environment is greatly different. In this case, by considering (specifically, multiplying) the weighting coefficient (for example, 10) described above for the altitude, the base station derivation unit 104 can derive the connection base station and the wireless frequency that possibly provides the communication environment that is appropriate for a current location of the wireless terminal 100.

[Equation 3]

$$Di = |Xk-Xi| + |Yk-Yi| + 10|Zk-Zi| \quad (3)$$

The radio resource allocation management unit 105 acquires a result of deriving the radio resource that is output from the base station derivation unit 104. In addition to the priorities of the connection base station and the wireless frequency as the radio resources that are derived by the base station derivation unit 104, for example, information indicating which wireless communication standard is used between the connection base station that is a candidate and the wireless terminal 100, or information pertaining to a frequency bandwidth may be included in this result of deriving the radio resource.

In cooperation with the connection base station, the radio resource allocation management unit 105 allocates a radio resource that is to be used for the wireless communication with the connection base station for management. This radio resource, for example, includes a wireless frequency that is to be used for wireless communication, and a Resource Block (RB) of the wireless frequency. The resource block, for example, refers to a unit of allocation of wireless frequency, which results from division into a frequency axis and a time axis (for example, a time slot) of the wireless frequency (for example, a subcarrier frequency).

The radio resource allocation management unit 105 inquires of the connection base station whether or not a resource block that is an allocation candidate for the wireless frequency is allocable. Based on the allocation candidate for the wireless frequency, the connection base station searches for an allocation situation of the resource block of the wireless frequency, determines whether or not the resource block is allocable, and transmits a result of the determination to the wireless terminal 100. Referring to this result of the determination, the radio resource allocation management unit 105 determines whether or not the resource block of the wireless frequency, which is an allocation candidate, is allocable. The result of the determination, for example, includes information on whether or not the resource block is allocable, or information on the resource block of the wireless frequency that is to be allocated in a case where the resource block is allocable.

Based on the result of the determination described above, the radio resource allocation management unit 105 allocates the resource block that is not allocated, of the wireless frequency, which is to be used for communication with the connection base station. The radio resource allocation management unit 105 may allocate the resource block and may designate Adaptive Modulation and Coding (AMC).

It is noted that in a case where the allocation of the wireless frequency that is the allocation candidate is impossible, the radio resource allocation management unit 105 performs changing from the wireless frequency to a wireless frequency that has the next highest priority, and selects a new wireless frequency from among wireless frequencies that are allocation candidates which have the next highest sequential order. In a case where the wireless frequency whose resource block allocable to the connection base station is not present, the radio resource allocation management unit 105 performs changing from the connection base station to the connection base station that has the next highest priority and selects a new connection base station from among the connection base stations that are the allocation candidates which have the next highest sequential order.

Furthermore, the radio resource allocation management unit 105 acquires information on a usage history of a radio resource, from the transmission packet generation unit 106 or the reception packet decoding unit 11. This information on the usage history, for example, includes information on the connection base station that wirelessly communicated with the wireless terminal 100, information on a wireless frequency that was used for the communication with the connection base station, and information on an amount of communication that was communicated using the wireless frequency. The radio resource allocation management unit 105 as an example of the update unit, for example, may add the amount of communication that is included in the information that is the usage history, to the wireless frequency in the total communication history table T1, which is the same as the wireless frequency that is included in the information on the acquired usage history, and may update the total communication history table T1.

The radio resource allocation management unit 105 sends information on the allocated radio resource, more precisely, information on the wireless frequency and the resource block that are to be used for communication with the connection base station, to the wireless transmission unit 107 or the wireless reception unit 110. In this case, the radio resource allocation management unit 105 sends information on the allocated radio resource for the uplink 21 to the wireless transmission unit 107. Furthermore, the radio resource allocation management unit 105 sends information on the allocated radio resource for the downlink 22 to the wireless reception unit 110.

The transmission packet generation unit 106 generates a packet (a transmission packet) that is to be transmitted to the wireless base station 200, using uplink data (UL data) that is input. The transmission packet includes data for the uplink 21. The data for the uplink 21 (for example, the control data or the user data), for example, is obtained from the memory 160, an external device (not illustrated) such as a storage device, and a processing unit for various pieces of software (not illustrated).

The transmission packet generation unit 106 sends information on a usage history of a radio resource relating to the communication of the transmission packet, to the radio resource allocation management unit 105.

The wireless transmission unit 107 as an example of a communication unit transmits a transmission packet that is generated by the transmission packet generation unit 106 to the connection base station that is referred to by the radio resource allocation management unit 105, through the transmission antenna 108 and the uplink 21, using a radio resource that is allocated by the radio resource allocation management unit 105.

The wireless reception unit 110 as an example of the communication unit receives the packet (for example, a reception packet) from the connection base station, through the downlink 22 and the reception antenna 109, using a radio resource that is allocated by the radio resource allocation management unit 105.

The reception packet decoding unit 111 decodes the reception packet that is received by the wireless reception unit 110 and thus obtains decoding data. The decoding data includes the data for the downlink 22. The data (for example, the control data or the user data) for the downlink 22, for example, is handed to the memory 160, an external device (not illustrated) such as a storage device or a display device, or a processing unit (not illustrated) for various pieces of software.

Furthermore, in some cases, the data for the downlink 22 includes information on a connection candidate base station that is selected using a well-known method. The information on the connection candidate base station is sent to the radio resource allocation management unit 105.

Furthermore, in some cases, the data for the downlink 22 includes control information pertaining to allocation of a radio resource. This control information is sent to the radio resource allocation management unit 105. The control information includes a result of determination of whether or not a resource block is allocable by the connection base station.

Furthermore, the reception packet decoding unit 111 sends information on a usage history of the radio resource relating to communication of the reception packet, to the radio resource allocation management unit 105.

Next, an operation procedure when a new communication connection request occurs to the wireless terminal 100 in the wireless communication system 10 according to the present embodiment will be described with reference to FIGS. 5 and 6.

Figure 5:
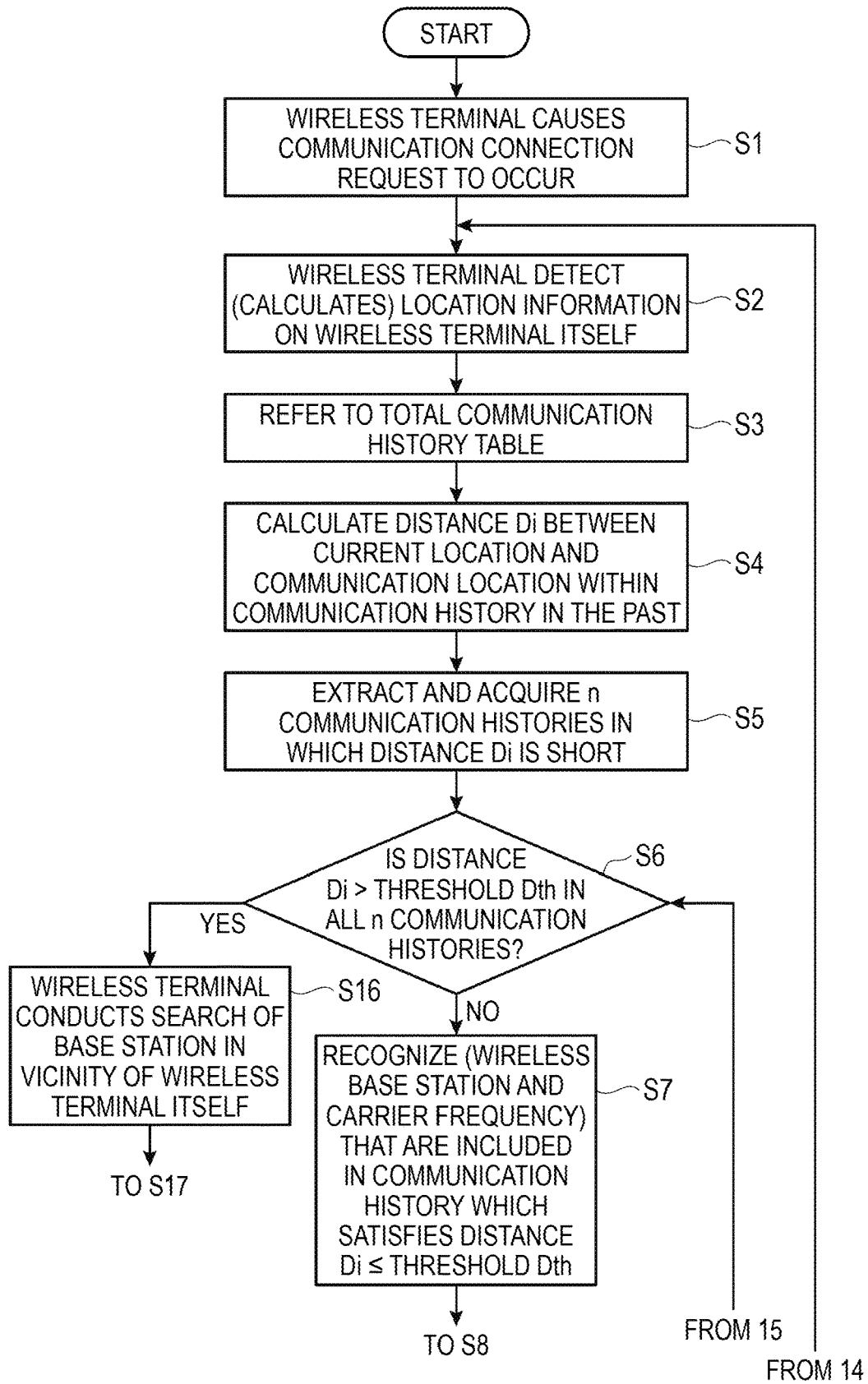
FIG. 5 is a flowchart for describing in detail an example of an operation procedure in a case where a communication connection request occurs to the wireless terminal according to the present embodiment.
Figure 6:
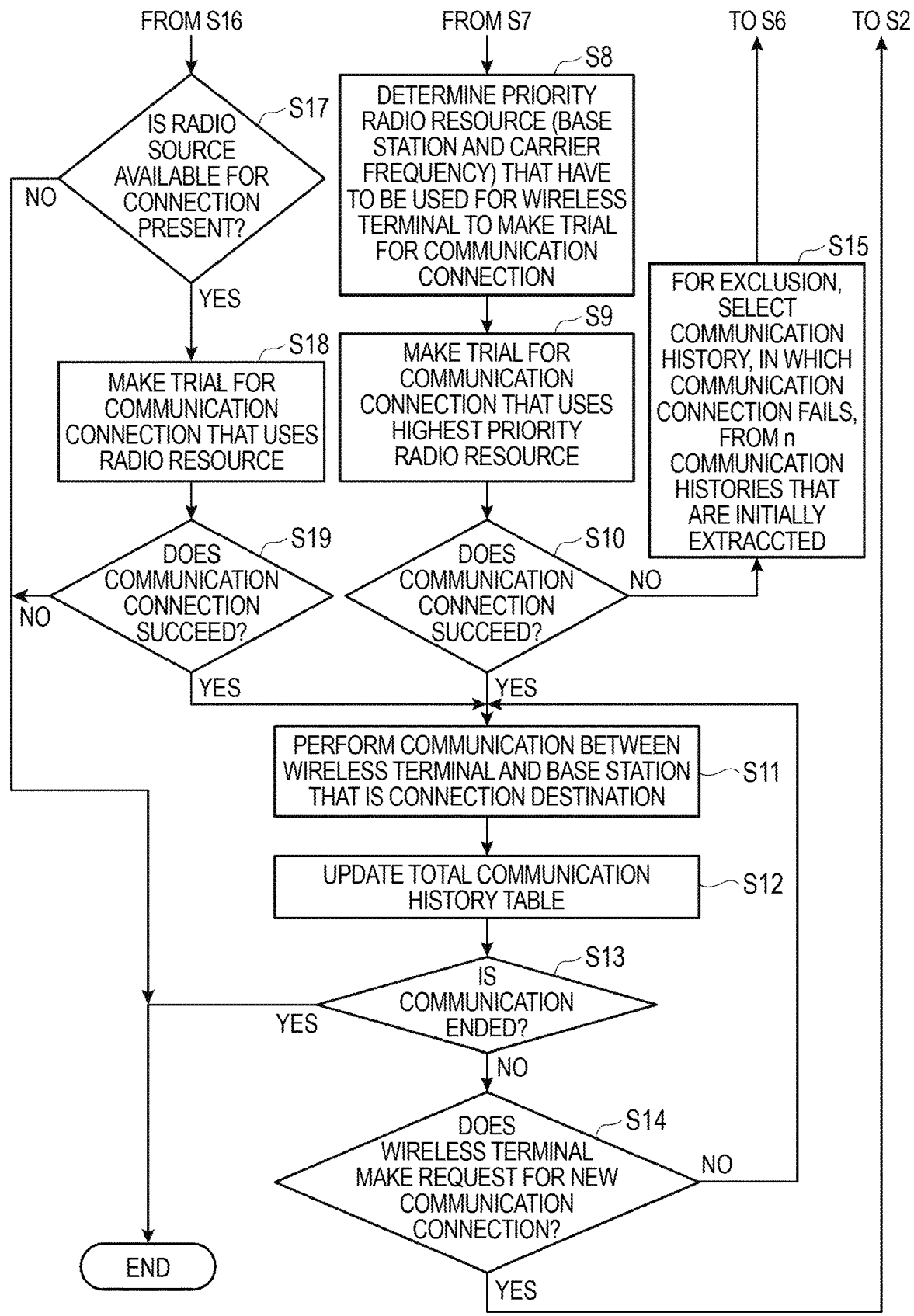
FIG. 6 is a flowchart for describing in detail an example of the operation procedure in the case where the communication connection request occurs to the wireless terminal according to the present embodiment.

FIGS. 5 and 6 are flowcharts for describing in detail an example of the operation procedure in a case where a communication connection request occurs to the wireless terminal 100 according to the present embodiment. For brief description, a case where the wireless terminal 100 is positioned indoors is exemplarily described with reference to FIGS. 5 and 6, and in the same manner, this description also applies in a case where the wireless terminal 100 is positioned indoors or in the vicinity of a border between the outside and the inside of a building.

In FIG. 5, the wireless reception unit 110 or the wireless transmission unit 107 of the wireless terminal 100 determines whether or not a new connection request occurs (S1). Connection requests, for example, include a connection request from the wireless terminal 100 to the wireless base station 200 and a connection request from the wireless base station 200 to the wireless terminal 100. For example, in a case where the wireless terminal 100 acquires and reproduces moving image data on a content server (not illustrated), the connection request from the wireless terminal 100 to the wireless base station 200 occurs. For example, in a case where a telephone call is made from any other wireless terminal to the wireless terminal 100, a connection request from any one wireless base station 200 to the wireless terminal 100 occurs.

The GPS reception unit 102 calculates and acquires location information on the GPS reception unit 102 (more precisely, location information on the wireless terminal 100 itself (location information on the GPS reception unit 102 itself)) based on the multiple signals that are received by the GPS antenna 101 (S2). The GPS reception unit 102 outputs the location information on the wireless terminal 100, which is obtained by the calculation, to the processor 150. For example, in the case where the wireless terminal 100 is positioned outdoors, the location information generation unit 103 generates the location information on the wireless terminal 100 (more precisely, current location information on the wireless terminal 100) based on the information from the GPS reception unit 102, and outputs the generated location information to the base station derivation unit 104.

Referring to the total communication history table T1 in the memory 160 (S3), the base station derivation unit 104 calculates the distance Di that is based on the current location information on the wireless terminal 100 that is obtained in Step S2 and the location information on the wireless terminal 100 in the communication history, which is obtained in Step S3, according to any one (for example, Equation (1)) of Equation (1) to Equation (3) (S4). Setting as to which Equation is used is performed in advance in each of the wireless terminals 100. The base station derivation unit 104 extracts and acquires a prescribed number (k is a default value) of communication histories in which the distance Di that is based on current location information on the wireless terminal 100 and on the location information on the wireless terminal 100 in the communication history is short (S5). A result of the extraction in Step S5, for example, is the high-level communication history table T2 that is illustrated in FIG. 4.

The base station derivation unit 104 determines whether or not each of the distances Di that correspond to all n high-level communication histories that are extracted in Step S5 is greater than a prescribed threshold Dth (S6). The prescribed threshold Dth, for example, is 300 (meter). In a case where each of the distances Di that correspond to all n high-level communication histories is not greater than the prescribed threshold Dth (NO in S6), the base station derivation unit 104 knows (recognizes) the radio resource (the wireless base station and the wireless frequency (the carrier frequency)) that is included in the communication history which satisfies distance Di prescribed threshold Dth (S7).

In FIG. 6, subsequent to Step S7, the base station derivation unit 104 determines the priorities of the connection base station and the wireless frequency that are candidates which have to make a trial for the communication of data (for example, the control data and the user data), among multiple wireless base stations 200 within the heterogeneous network 20 (S8). The radio resource allocation management unit 105 allocates a radio resource (the identification number of the connection base station and the identification number of the wireless frequency) that has the highest priority, to the wireless transmission unit 107 and the wireless reception unit 110, among sequential orders that are determined in Step S8 and makes a trial for communication connection to the connection base station (S9). For example, the transmission packet generation unit 106 generates the transmission packet that includes the data for the uplink 21. The wireless transmission unit 107 wirelessly transmits the transmission packet to the connection base station that is determined. Furthermore, for example, the wireless reception unit 110 wirelessly receives the reception packet from the connection base station that is determined. The reception packet decoding unit 111 decodes the reception packet and obtains the data for the downlink 22.

More precisely, the wireless terminal 100 inquires of the connection base station, which is a candidate that makes a trial for communication connection, whether or not a resource block of the wireless frequency is allocable for the wireless communication with the wireless terminal 100. In a response to the inquiry from the wireless terminal 100, in a case where it is determined that the resource block of the wireless frequency is allocable, the connection base station transmits a message that the communication connection succeeds, to the wireless terminal 100.

In a case where the communication connection succeeds (YES in S10), the wireless transmission unit 107 or the wireless reception unit 110 of the wireless terminal 100 performs communication of data (for example, the control data and the user data) with the connection base station (S11). Moreover, the radio resource allocation management unit 105 as an example of the update unit writes the history (specifically, at least the identification number of the wireless base station 200 that is the connection base station, and the identification number of the wireless frequency (the carrier frequency) of the communication with the connection base station, the communication connection to which succeeds, into the total communication history table T1 (S12) for update.

It is noted that the trial for communication connection in Step S10 or Step S19 may be made for bidirectional communication and may be made for one of the transmission and the reception. Therefore, the total communication history table T1 in Step S12 may be updated when either transmission or the reception is performed.

At this point, if the communication is ended (YES in S13), processing by the wireless terminal 100 is ended.

On the other hand, in a case where the communication is not ended (NO in S13) and where a request for a new communication connection occurs to the wireless terminal 100 (YES in S14), the processing by the wireless terminal 100 returns to Step S2. It is noted that, in a case where a situation of a communication line to the connection base station (the wireless base station 200) that is currently being connected deteriorates, such as one in which the wireless terminal 100 moves while performing the wireless communication, in Step S14, the wireless terminal 100 causes a request for a new communication connection to occur.

Furthermore, in a case where the communication is not ended (NO in S13) and where the request for a new communication connection does not occur to the wireless terminal 100 (NO in S14), the wireless terminal 100 continues the communication with the connection base station (the wireless base station 200) that starts the communication in Step S11 (S11).

Furthermore, in a case where the communication connection fails in Step S10 (NO in S10), for exclusion, the base station derivation unit 104 selects the communication history in which the communication connections fails, from among n communication histories that are initially extracted (S15). Subsequent to Step S15, the base station derivation unit 104 determines whether or not each of the distances Di that correspond to all the remaining communication histories (for example, (n−1) communication histories) that results from the exclusion in Step S15 is greater than the prescribed threshold Dth (S6). Processing operations subsequent to Step S6 are the same, detailed descriptions are omitted.

Furthermore, in a case where it is determined that each of the distance Di that correspond to all the high-level n communication histories which are extracted in Step S5 is greater than the prescribed threshold Dth (NO in S6), the base station derivation unit 104 conducts a search (a cell search) of a candidate wireless base station 200 available for communication connection in the vicinity of the wireless terminal 100 itself, using a well-known method (S16). In this case, based on a result of the search for the wireless base station 200 that is present in the vicinity of the wireless terminal 100, the base station derivation unit 104 determines a wireless base station that can be a connection candidate.

In this well-known method, for example, the base station derivation unit 104 sequentially searches for wireless base stations 200 that use RAT 1 to RAT 5, and the wireless transmission unit 107 notifies a prescribed base station of a result of the search. According to the notified result of the search, the prescribed base station selects a wireless base station that can be the connection candidate and transmits information on the wireless base station to the wireless terminal 100. The base station derivation unit 104 acquires the information on the wireless base station that can the connection candidate, from the reception packet that is received by the wireless reception unit 110 and is decoded by the reception packet decoding unit 111, and makes a determination as the wireless base station that is the connection candidate.

It is noted that as the well-known method, a method is exemplarily described in which the result of the cell search is notified to a prescribed wireless base station and the prescribed wireless base station transfers the information on the wireless base station that can be the connection candidate, to the wireless terminal 100. Instead of this, the wireless terminal 100 itself may determine the wireless base station that can be the connection candidate, based on the result of the cell search, without the result of the cell search being notified to the prescribed wireless base station. In a case where the wireless base station 200 that has a radio resource available for connection in Step S16 is not present (NO in S17), because the wireless base station 200 that possibly makes a connection to the wireless terminal 100 is not present, it is impossible for the wireless terminal 100 to perform communication, and the processing is ended.

In a case where the wireless base station 200 that has a radio resource available for connection in Step S16 is present (YES in S17), the base station derivation unit 104 determines the wireless base station 200 as a connection candidate base station. It is noted that only one wireless base station may be determined as being able to be the connection candidate may be determined, and that multiple wireless base stations may be determined as being able to be the connection candidates. Furthermore, in a case where multiple connection candidate base stations are determined, the base station derivation unit 104 may set priorities of the multiple connection candidate base stations to be high. For example, the base station derivation unit 104 sets the connection candidate base station having a large amount of communication to be high.

When the wireless base station that can be the connection candidate is determined, in a case where there is one wireless base station that is determined, the radio resource allocation management unit 105 selects the wireless base station 200 as the connection base station. Furthermore, in a case where multiple wireless base stations that can be the determined connection candidates are present, the radio resource allocation management unit 105 selects one from among the multiple wireless base stations that can be multiple connection candidates. For example, the radio resource allocation management unit 105 may select the connection candidate base station having a large amount of communication at the time of the communication in the past, as the connection base station.

The radio resource allocation management unit 105 allocates the radio resource that is used for the communication with the wireless base station that can be the connection candidate and makes a trial for communication connection to the wireless base station (S18). The allocation of the radio resource is performed using a well-known method. In the well-known method, by the wireless terminal 100 or the wireless base station that can be the connection candidate, line quality (an amount of interference) of every wireless frequency is measured, and the wireless frequency that is to be used for the communication between the wireless terminal 100 and the wireless base station that can be the connection candidate is allocated.

With reference to Step S18, specifically, the wireless terminal 100 inquires of the connection base station, which is a candidate that makes a trial for communication connection, whether or not a resource block of the wireless frequency is allocable for the wireless communication with the wireless terminal 100. In response to the inquiry from the wireless terminal 100, in a case where it is determined that the resource block of the wireless frequency is allocable, the connection base station transmits a message that the communication connection succeeds, to the wireless terminal 100.

In a case where the communication connection succeeds (YES in S19), the wireless transmission unit 107 or the wireless reception unit 110 of the wireless terminal 100 performs communication of data (for example, the control data and the user data) with the connection base station (S11). On the other hand, in a case where the communication connection fails (NO in S19), because the wireless base station 200 that possibly makes a connection to the wireless terminal 100 is not present, it is impossible for the wireless terminal 100 to perform communication, and the processing is ended.

As described above, in the wireless communication system 10 according to the present embodiment, it is possible that the wireless terminal 100 communicates with multiple wireless base stations 200 through the heterogeneous network 20 in which multiple wireless communication schemes are used in a mixed manner. At the time of the communication in the past with each of the wireless base stations 200, the wireless terminal 100 accumulates at least the location information on the wireless terminal 100 and information (for example, at least the identification number of the connection base station) pertaining to the wireless base station 200 as the communication history, and acquires current location information on the wireless terminal 100. Based on current location information of the wireless terminal 100 and the communication history in the past, the wireless terminal 100 derives the connection base station as the wireless base station that is used for the data communication, from among multiple wireless base stations 200, and performs the data communication with the connection base station.

Accordingly, based on the communication history in the past in a current location of the wireless terminal itself, the wireless terminal 100 can determine and allocate the wireless base station that is a communication partner when a request is made for the connection for new wireless communication. Because of this, the degradation of the probability of connection to an optimal cell can be suppressed. Therefore, the wireless terminal 100 can derive any one of the wireless base stations 200 as the connection base station. Because of this, for example, there is no need to conduct a search (a cell search or discovery) of the wireless base station 200 using a well-known method. More precisely, the wireless terminal 100 does not need to sequentially scan a wireless communication scheme (the RAT) that is employable and to search for the wireless base station 200 that is positioned in the vicinity of the wireless terminal 100. In this case, the wireless terminal 100 does not need to conduct cell searches as many as there are RATs that are present in the heterogeneous network. For this reason, the wireless terminal 100 can reduce processing load or processing time for searching for the wireless base station 200 that is a connection destination.

Furthermore, as described above, in the related art, a method is proposed in which an entire coverage area of the heterogeneous network is partitioned into area blocks of certain size, in which a location of the wireless terminal 100 is associated with an area block number, and in which an attempt is made to make a connection to an optimal cell using a communication history for every area block number. However, in this method, regardless of a magnitude of the area block, an amount of prior work for dividing the entire coverage area of the heterogeneous network into area blocks is also huge, and a memory capacity of the wireless terminal increases as well. On the other hand, in the present embodiment, when a request is made for a new communication connection, based on a current location of the wireless terminal 100 and the location of the wireless terminal 100 that is included in the communication history in the past, the wireless terminal 100 can derive the wireless base station 200 (the connection base station) that is suitable the data communication. For this reason, in the present embodiment, when compared with the proposed scheme, there is no need for prior troublesome work, such as one for partitioning an entire coverage area of a heterogeneous network into area blocks (for example, an area block that results from considering three-dimensional location information), and there is also no increase in a capacity of the memory 160 of the wireless terminal 100.

Furthermore, the wireless terminal 100 derives the connection base station with a preference for the wireless base station, the allocation to which are performed many times, from the prescribed number k of communication histories in which the distance Di that is based on current location information on the wireless terminal 100 and the location information on the wireless terminal 100 that is included in the communication history in the past is short. Accordingly, the wireless terminal 100 can communicate with the wireless base station that was many times used in the communication history when the distance Di was short (in other words, a distance between a current location and the location at the time of the wireless communication in the past was short), as the connection base station, and can stably communicate with a suitable connection base station that has the communication record in the current location.

Furthermore, in a case where the distance Di is at or below the prescribed threshold Dth, the wireless terminal 100 derives the connection base station, with a reference for the wireless base station, the allocation to which was many times performed, from the prescribed number k of communication histories in the past. Accordingly, it is possible that a communication history in which the distance Di is greater than the prescribed threshold Dth (in other words, a communication history in a case where there is a long distance between a location of the wireless terminal at the time of the wireless communication by the wireless terminal 100 in the past and a current location thereof) is excluded and that the high-level communication history table T2 is generated. Because of this, the wireless terminal 100 can perform allocation of a more suitable radio resource (for example, the identification number of the wireless base station) according to an environment of a network that is provided in the vicinity of the current location.

Furthermore, the wireless terminal 100 further accumulates information on an amount of data communication with the connection base station, as the communication history and derives the connection base station, with a reference for the wireless base station has a large amount of data communication, from the prescribed number k of communication histories in the past, in which the distance Di is short. Accordingly, it is possible that the connection base station, which possibly provides a small cell (in other words, a cell that has a high likelihood that there will be a large amount of communication data) where the high-speed throughput is obtained, as is the case with the 5th generation mobile communication system (5G), over the heterogeneous network 20, is preferentially allocated, and an amount of suitable communication data is easy to perform.

Furthermore, when performing the data communication with the derived connection base station, the wireless terminal 100 accumulates information pertaining to the connection base station pertaining to the data communication, as the communication history that is associated with current location information on the wireless terminal 100, in the memory 160. Accordingly, the wireless terminal 100 can accumulate the communication history in which the identification number of the connection base station that is a communication partner of the wireless terminal 100 itself is associated with the location at the time of the communication, as the communication record that is generated each time the wireless communication is actually performed, in the memory 160, and thus can perform learning.

Furthermore, the wireless terminal 100 further accumulates information on the wireless frequency that is to be used for the data communication with the connection base station, as the communication history, and derives the wireless frequency that is used for the data communication with the connection base station, using the information on the wireless frequency that is included in the communication history. The wireless terminal 100 performs the data communication with the derived connection base station, using the derived wireless frequency. Accordingly, the wireless terminal 100 can manage not only the identification number of the connection base station, but also the identification number of the wireless frequency (the carrier frequency) at the time of the wireless communication, as the radio resources, in a manner that is associated with the location information. Because of this, the connection base station and the wireless frequency that are suitable can be derived when a request is made for new communication connection and communication can be quickly performed without waste.

Furthermore, the wireless terminal 100 can derive the connection base station and the wireless frequency, with a preference for the wireless base station and the wireless frequency, the allocation to which are performed many times, from the prescribed number k of communication histories in which the distance Di is short. Accordingly, the wireless terminal 100 can perform stable communication with the suitable connection base station having the communication record at a current location using the wireless frequency that was used many times used in the communication histories when the distance Di is short (in other words, a distance between a current location and the location at the time of the wireless communication in the past was short).

Furthermore, in the case where the distance Di is at or below the prescribed threshold Dth, the wireless terminal 100 derives the connection base station and the wireless frequency, with a preference for the wireless base station and the wireless frequency, the allocation to which was many times performed, from the prescribed number k of communication histories in the past. Accordingly, it is possible that a communication history in which the distance Di is greater than the prescribed threshold Dth (in other words, a communication history in a case where there is a long distance between a location of the wireless terminal at the time of the wireless communication by the wireless terminal 100 in the past and a current location thereof) is excluded and that the high-level communication history table T2 is generated. Because of this, the wireless terminal 100 can perform allocation of a more suitable radio resource (for example, the identification number of the wireless base station and the identification number of the wireless frequency) according to an environment of a network that is provided in the vicinity of the current location.

Furthermore, the wireless terminal 100 further accumulates the information on the wireless frequency that is to be used for the data communication with the connection base station and the information on the amount of data communication with the connection base station, as the communication history and derives the connection base station and the wireless frequency, with a reference for the wireless base station and the wireless frequency that has a large amount of data communication, from the prescribed number k of communication histories in which the distance Di is short. Accordingly, it is possible that the connection base station and the wireless frequency, which possibly provide a small cell (in other words, a cell that has a high likelihood that there will be a large amount of communication data) where the high-speed throughput is obtained, as is the case with the 5th generation mobile communication system (5G), over the heterogeneous network 20, are preferentially allocated, and an amount of suitable communication data is easy to perform.

Furthermore, when performing the data communication with the derived connection base station, the wireless terminal 100 accumulates the information pertaining to the connection base station pertaining to the data communication and the information on the wireless frequency, as the communication history that is associated with current location information on the wireless terminal 100, in the memory 160. Accordingly, the wireless terminal 100 can accumulate the communication history in which the identification number of the connection base station that is a communication partner of the wireless terminal 100 itself and the identification number of the wireless frequency are associated with the location at the time of the communication, as the communication record that is generated each time the wireless communication is actually performed, in the memory 160, and thus can perform learning.

Furthermore, the location information on the wireless terminal 100, for example, is a combination of pieces of effective (latitude, longitude, altitude) information, and the wireless terminal 100 derives the distance Di with a preference for, for example, the altitude, among the latitude, longitude, and the altitude. Although the latitudes or the longitudes in the location information on the wireless terminal 100 are the same, when the altitudes are different, in some cases, a communication environment is greatly different. Therefore, the wireless terminal 100 calculates the distance Di, with a reference for the altitude, and thus can derive the connection base station and the wireless frequency that possibly provide the communication environment that is appropriate for a current location of the wireless terminal 100 itself.

Furthermore, in the present embodiment, in a case where the wireless terminal 100 is positioned indoors or in the vicinity of a border between the outside and the inside of a building, the location information on the wireless terminal 100 may be location information that is obtained by relative distances from multiple BLE beacons 60 that are installed indoors. Accordingly, in a case where the wireless terminal 100 is positioned outdoors, for example, a location of the wireless terminal 100 can be specified with information that is (latitude, longitude, altitude) that is calculated by the GPS reception unit 102. Furthermore, on the other hand, in a case where the wireless terminal 100 is positioned indoors or in the vicinity of a border between the outside and the inside of a building, for example, a location of the wireless terminal 100 can be specified with information that is the relative distance from the BLE beacon 60, which is calculated by the BLE reception unit 122.

Various embodiments are described above with reference to the drawings, but it goes without saying that the present invention is not limited to such examples. It is apparent to a person of ordinary skill in the art that various modification examples or revision examples can be contemplated within the scope of a claim, and, of course, it is understood that these also justifiably fall within the technical scope of the present invention. Furthermore, the constituent elements in the embodiments, which are described above, may be voluntarily combined within the scope that does not depart from the gist of the invention.

It is noted that the present application claims the benefit of earlier filing date and right of priority to Japanese Patent Application (No. 2016-236917) filed on Dec. 6, 2016, the contents of which are incorporated by reference herein in its entirety.

INDUSTRIAL APPLICABILITY

The present disclosure provides a wireless terminal and a wireless base station allocation method that determine and allocate a wireless base station that is a communication partner when a request is made for a connection for wireless communication, based on a communication history at a current location of the wireless terminal itself, and suppresses a degradation of a probability of connection to an optimal cell.

REFERENCE SIGNS LIST

10 WIRELESS COMMUNICATION SYSTEM
20 HETEROGENEOUS NETWORK
21 UPLINK
22 DOWNLINK
50 GPS SATELLITE
60 BLE BEACON
100 WIRELESS TERMINAL
101 GPS ANTENNA
102 GPS RECEPTION UNIT
103 LOCATION INFORMATION GENERATION UNIT
104 BASE STATION DERIVATION UNIT
105 RADIO RESOURCE ALLOCATION MANAGEMENT UNIT
106 TRANSMISSION PACKET GENERATION UNIT
107 WIRELESS TRANSMISSION UNIT
108 TRANSMISSION ANTENNA
109 RECEPTION ANTENNA
110 WIRELESS RECEPTION UNIT
111 RECEPTION PACKET DECODING UNIT
121 BLE ANTENNA
122 BLE RECEPTION UNIT
150 PROCESSOR
160 MEMORY
200 WIRELESS BASE STATION
T1 TOTAL COMMUNICATION HISTORY TABLE
T2 HIGH-LEVEL COMMUNICATION HISTORY TABLE

The invention claimed is:

1. A wireless terminal that is capable of performing communication with multiple wireless base stations through a network in which multiple wireless communication schemes are used in a mixed manner, the wireless terminal comprising:
an accumulation unit that accumulates at least location information on the wireless terminal and information relating to the wireless base station, as a communication history, at the time of communication in the past with each of the wireless base stations;
an acquisition unit that acquires the location information on the wireless terminal;
a derivation unit that derives a connection base station, as a wireless base station that is to be used for data communication, of the multiple wireless base stations, based on the location information on the wireless terminal and the communication history that is accumulated in the accumulation unit; and
a communication unit that performs the data communication with the derived connection base station,
wherein the accumulation unit further accumulates information on an amount of data communication with the connection base station as the communication history, and
wherein the derivation unit derives the connection base station with a preference for a wireless base station that has a larger amount of data communication, in reference to a number of communication histories in which a distance is short, the distance being based on the acquired location information on the wireless terminal and the accumulated location information on the wireless terminal included in the communication history.

2. The wireless terminal according to claim 1,
wherein the derivation unit derives the connection base station with a preference for a wireless base station, which has been allocated more.

3. The wireless terminal according to claim 2,
wherein the derivation unit derives the connection base station with a preference for a wireless base station that has been allocated more, responsive to the distance being below a prescribed threshold.

4. The wireless terminal according to claim 1, further comprising:
an update unit that accumulates information relating to the connection base station relating to the data communication, as a communication history that is associated with the acquired location information on the wireless terminal, in the accumulation unit, responsive to the data communication with the derived connection base stationer being performed.

5. The wireless terminal according to claim 1,
wherein the accumulation unit further accumulates information on a wireless frequency that is to be used for the data communication with the connection base station as the communication history,
wherein the derivation unit derives the wireless frequency that is to be used for the data communication with the connection base station, using the information on the wireless frequency that is included in the communication history, and
wherein the communication unit performs the data communication with the derived connection base station using the derived wireless frequency.

6. The wireless terminal according to claim 5,
wherein the derivation unit derives the connection base station and the wireless frequency with a preference for a wireless base station and a wireless frequency, which have been allocated more, in reference to the number of communication histories in which the distance is short.

7. The wireless terminal according to claim 6,
wherein the derivation unit derives the connection base station and the wireless frequency with a preference for a wireless base station and a wireless frequency, which have been allocated more, in reference to the number of communication histories in which the distance is short responsive to the distance being below a prescribed threshold.

8. The wireless terminal according to claim 1,
wherein the accumulation unit further accumulates information on a wireless frequency that is to be used for the data communication with the connection base station as the communication history,
wherein the derivation unit derives the connection base station and the wireless frequency with a preference for a wireless base station and a wireless frequency that have a larger amount of data communication, in reference to the number of communication histories in which the distance is short.

9. The wireless terminal according to claim 5, further comprising:
an update unit that accumulates information relating to the connection base station pertaining to the data communication and information on the wireless frequency, as a communication history that is associated with the location information on the wireless terminal, in the accumulation unit, responsive to the data communication with the derived connection base station being performed.

10. The wireless terminal according to claim 2,
wherein the location information on the wireless terminal has a latitude, a longitude, and altitude, and
wherein the derivation unit derives the distance with a preference for the altitude among the latitude, the longitude and the altitude.

11. The wireless terminal according to claim 6,
wherein the location information on the wireless terminal has a latitude, a longitude, and altitude, and
wherein the derivation unit derives the distance with a preference for the altitude among the latitude, the longitude and the altitude.

12. A wireless base station allocation method in a wireless terminal that is capable of performing communication with multiple wireless base stations through a network in which multiple wireless communication schemes are used in a mixed manner, the wireless base station allocation method comprising:
accumulating at least location information on the wireless terminal and information relating to the wireless base station, as a communication history, at the time of communication in the past with each of the wireless base stations;
acquiring the location information on the wireless terminal;
deriving a connection base station, as a wireless base station that is to be used for data communication, of the multiple wireless base stations, based on the acquired location information on the wireless terminal and the communication history that is accumulated;
performing the data communication with the derived connection base station;
accumulating information on an amount of data communication with the connection base station as the communication history; and
deriving the connection base station with a preference for a wireless base station that has a larger amount of data communication, in reference to a number of communication histories in which a distance is short, the distance being based on the acquired location information on the wireless terminal and the accumulated location information on the wireless terminal included in the communication history.

13. A wireless terminal that is capable of performing communication with multiple wireless base stations through a network in which multiple wireless communication schemes are used in a mixed manner, the wireless terminal comprising:
an accumulation unit that accumulates at least location information on the wireless terminal and information relating to the wireless base station, as a communication history, at the time of communication in the past with each of the wireless base stations;
an acquisition unit that acquires the location information on the wireless terminal;
a derivation unit that derives a connection base station, as a wireless base station that is to be used for data communication, of the multiple wireless base stations, based on the location information on the wireless terminal and the communication history that is accumulated in the accumulation unit;
a communication unit that performs the data communication with the derived connection base station; and
an update unit that accumulates information relating to the connection base station relating to the data communication, as a communication history that is associated with the acquired location information on the wireless terminal, in the accumulation unit, responsive to the data communication with the derived connection base station being performed.

14. A wireless terminal that is capable of performing communication with multiple wireless base stations through a network in which multiple wireless communication schemes are used in a mixed manner, the wireless terminal comprising:
- an accumulation unit that accumulates at least location information on the wireless terminal and information relating to the wireless base station, as a communication history, at the time of communication in the past with each of the wireless base stations;
- an acquisition unit that acquires the location information on the wireless terminal;
- a derivation unit that derives a connection base station, as a wireless base station that is to be used for data communication, of the multiple wireless base stations, based on the location information on the wireless terminal and the communication history that is accumulated in the accumulation unit; and
- a communication unit that performs the data communication with the derived connection base station,
- wherein the accumulation unit further accumulates information on a wireless frequency that is to be used for the data communication with the connection base station as the communication history,
- wherein the derivation unit derives the wireless frequency that is to be used for the data communication with the connection base station, using the information on the wireless frequency that is included in the communication history, and
- wherein the communication unit performs the data communication with the derived connection base station using the derived wireless frequency.

* * * * *